United States Patent [19]

Cagle

[11] 3,975,992

[45] Aug. 24, 1976

[54] LIFT CONTROL SYSTEM FOR PRESS UNLOADER OR THE LIKE

[75] Inventor: Harlan R. Cagle, Clarkston, Mich.

[73] Assignee: Sahlin International, Inc., Birmingham, Mich.

[22] Filed: Nov. 14, 1974

[21] Appl. No.: 524,009

Related U.S. Application Data

[60] Continuation of Ser. No. 358,917, May 10, 1973, abandoned, which is a division of Ser. No. 147,367, May 27, 1971, Pat. No. 3,732,989.

[52] U.S. Cl. .................................... 92/129; 92/110; 91/404; 91/451

[51] Int. Cl.[2] ........................ F16J 1/12; F01B 31/00; F15B 13/042

[58] Field of Search ............................... 92/129, 110

[56] References Cited

UNITED STATES PATENTS

| | | | |
|---|---|---|---|
| 1,656,149 | 1/1928 | Hopkins | 92/110 |
| 2,415,181 | 2/1947 | Johnson | 92/110 |
| 2,604,076 | 7/1952 | Trevaskes | 92/110 |
| 2,906,248 | 9/1959 | Peras | 92/110 |
| 3,118,349 | 1/1964 | Combs | 92/129 |
| 3,442,443 | 5/1969 | Kilbourn | 92/129 |

*Primary Examiner*—Paul E. Maslousky
*Attorney, Agent, or Firm*—Harness, Dickey & Pierce

[57] ABSTRACT

There is herein disclosed a lift control system for a press unloader having an extendable and retractable jaw means for gripping and removing a part from the die cavity of a press with pivotal frame means supporting the jaw means for pivotal movement to lift the part from the die cavity and interconnected air operated power cylinder means to sequentially extend the jaw means, grip the part, lift the part, and retract the jaw means.

2 Claims, 3 Drawing Figures

LIFT CONTROL SYSTEM FOR PRESS UNLOADER OR THE LIKE

RELATED APPLICATION

This is a continuation of application Ser. No. 358,917, filed May 10, 1973, now abandoned which latter application was a division of my copending U.S. application, Serial No. 147,367, filed May 27, 1971, now patent No. 3,732,989.

BACKGROUND AND SUMMARY OF THE INVENTION

While the concept and principles of the present invention may be applicable to various types of apparatus and environments, the invention disclosed herein relates generally to press unloading apparatus and, more particularly, to press unloading devices of the type disclosed in U.S. Pats. No. 2,609,776 and 3,206,040 and to control systems therefor of the type disclosed in U.S. Pats. No. 3,474,825; 3,436,186; and 3,394,650.

It is the primary object of the present invention to provide new and improved means for lifting a formed part out of a die cavity in a press prior to removal of the part from the press cavity. To this end, a new and improved air operated control system has been devised in which the number of parts required to achieve the desired results has been reduced, the parts of the system have been arranged in a new and improved manner facilitating assembly, operation, and repair, and new and improved parts have been devised for the system.

In the presently preferred embodiment of the inventive concepts and principles, a first air operated power cylinder means actuates jaw means carried by the press unloader device between an extended part gripping position in the press cavity and a retracted position while a second air operated power cylinder means moves the jaw means between the extended part gripping position and a lift position prior to return movement of the jaw means to the retracted position. The second cylinder means is connected to high pressure air inlet hoses and exhaust hoses in series with the first cylinder means and provided with integral control means effecting a time delay of operative connection to the jaw means whereby the desired sequential operation of the apparatus is obtained. It is contemplated that the inventive concepts are also applicable to fluid operated power cylinder apparatus generally whenever a time delay operation is required. Thus, in the broadest aspects of the invention, the power cylinder apparatus may be air operated or hydraulically operated and associated with any kind of machinery, particularly material handling equipment.

BRIEF DESCRIPTION OF THE DRAWING

The presently preferred embodiment is illustrated in the accompanying drawing wherein.

DETAILED DESCRIPTION

Figure 1:
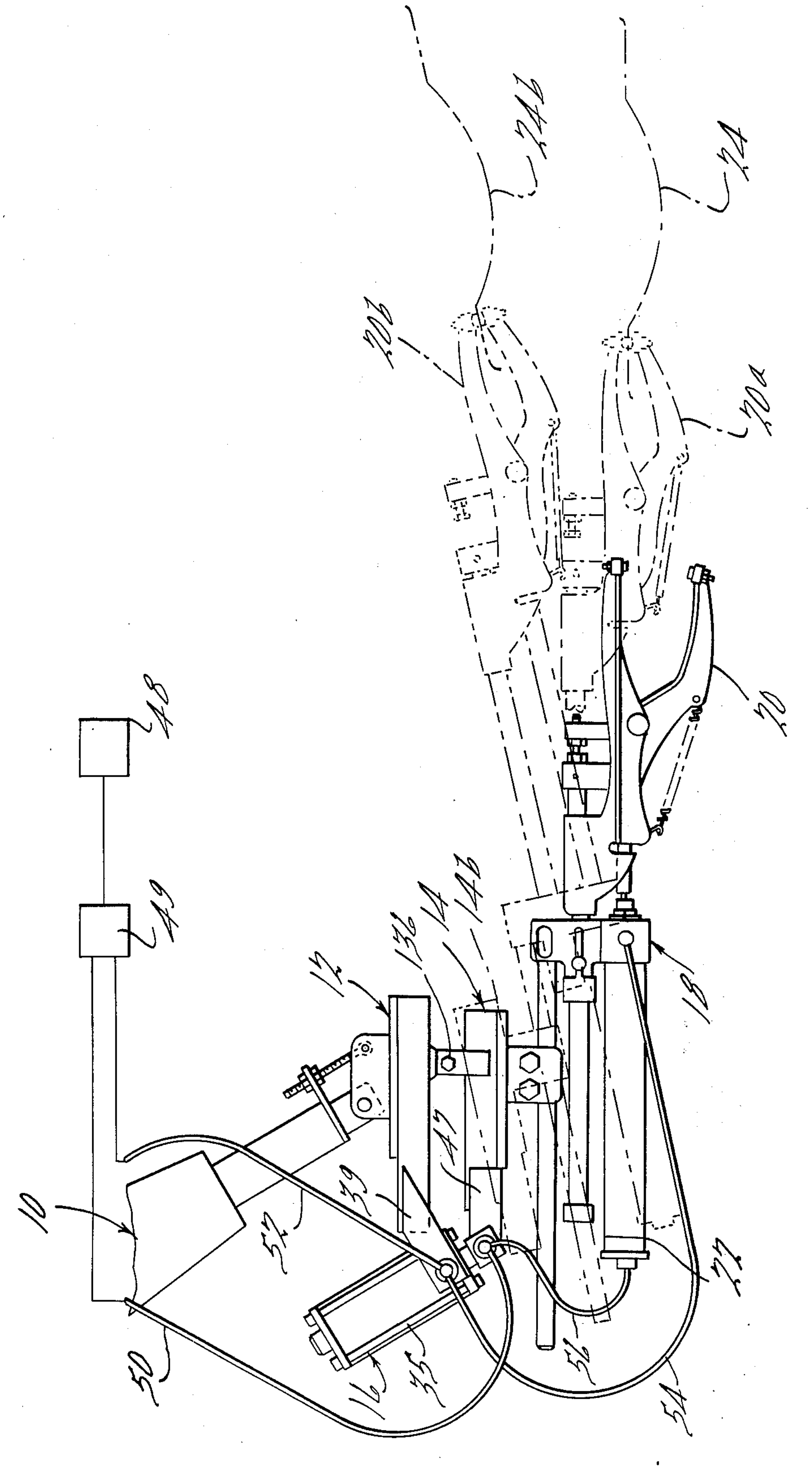
FIG. 1 is a side elevational view of a portion of a press unloading device incorporating the inventive concepts and principles.

Referring now to FIG. 1, the bottom portion of a conventional swinging air type press unloader is shown to comprise a swingable support arm 10, a fixed support frame means 12, adjustably connected to and carried by the support arm, a movable support frame means 14 pivotally mounted on the fixed support frame, an air operated power cylinder means 16 pivotally mounted on the fixed support frame 12 and pivotally operably connected to the movable support frame 14, and a part gripping unit 18 carried by the movable support frame. The part gripping unit 18 comprises jaw means 20 movable between a retracted position, as shown by the solid lines of FIG. 1, and an extended part gripping position, shown in phantom at 20*a* and 20*b*, by an air operated power cylinder means 22. The jaw means is also movable between an open release position, as shown by the solid lines of FIG. 1 and a closed part gripping position as shown in 20*a* and 20*b*. The movable support frame 14 and unit 18 are pivotally movable between the extended part gripping position 20*a* and a lift position as shown at 20*b* to enable the part 24 to be lifted clear of the die cavity in the press.

Figure 2:
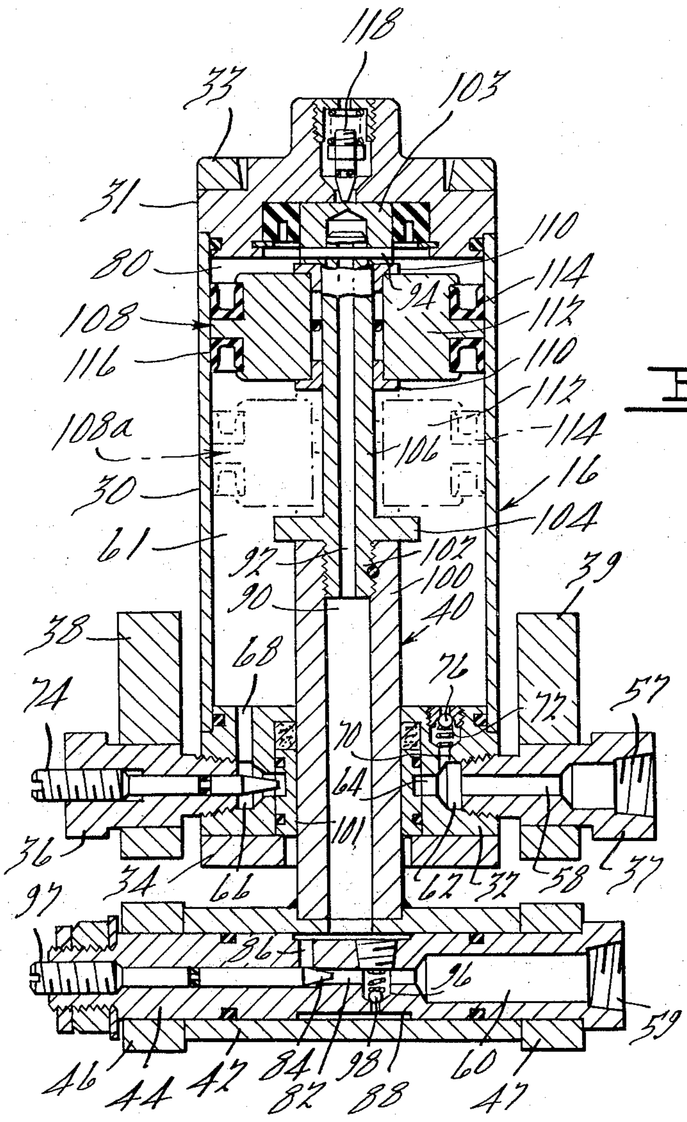
FIG. 2 is an enlarged cross-sectional view of a portion of the apparatus of FIG. 1.
Figure 3:
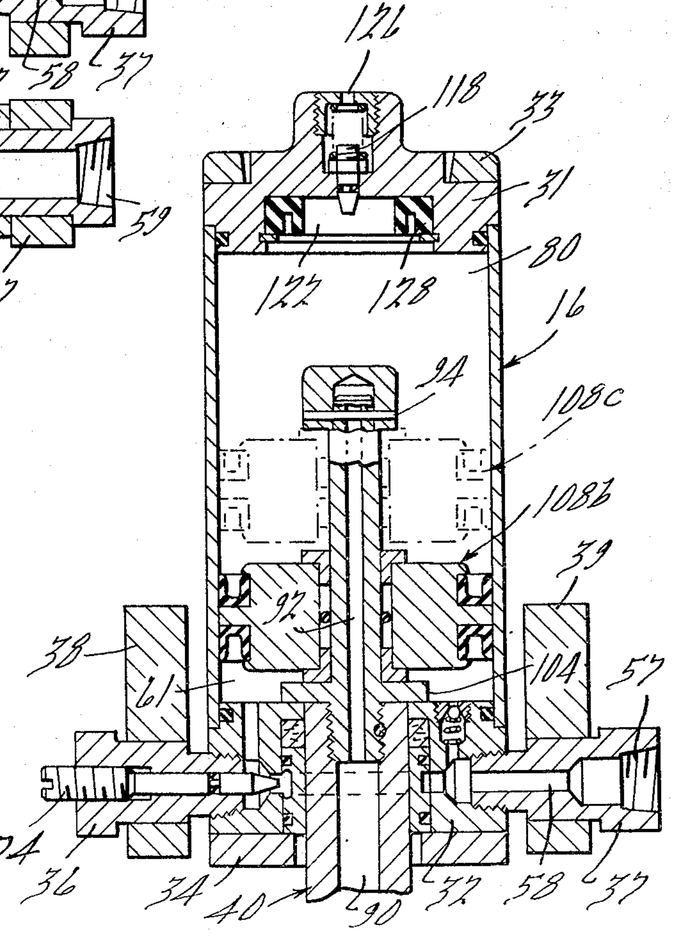
FIG. 3 is another enlarged cross sectional view of a portion of the apparatus of FIG. 2 in a different operational position.

Referring now to FIGS. 2 and 3, the air operated power cylinder means 16 comprises a cylindrical member 30 having pivotal connecting means in the form of spaced opposite end plates 31, 32 and tie plates 33, 34 secured by suitable fastening means 35. The cylinder is pivotally mounted on fixed support frame 12 by bearing members 36, 37 rotatably mounted in support arms 38, 39 fixed to plate 12 and threadably mounted in cylinder end plate 32 at the bottom of the power cylinder. The cylinder 16 is operatively connected to the movable frame means 14 by a movable piston rod 40 and pivotal connecting means in the form of a bearing sleeve 42 and a bearing shaft 44 pivotally mounted in arm portions 46, 47 fixed on the movable frame. A conventional high pressure air source 48 is connected to the power cylinder 16 through conventional control valve means 49 by air hose means 50, 52 and to the power cylinder 22 by air hose means 54, 56. Air hose 52 is attached to the pivotally mounted bearing member 37 by a conventional threaded coupling (not shown) mounted in a threaded portion 57 of a central air passage 58 so as to be pivotally movable therewith and air hose 50 is similarly attached to the pivotally mounted bearing shaft 44 by a threaded portion 59 of a central air passage 60. Air passage 58 is connected to one side 61 of the cylinder through air passage means comprising a chamber 62, an annular inlet passage 64, a valve chamber 66, and an inlet passage 68. Chamber 62 is also connected to the same side of the cylinder through an air outlet passage 70 and a valve chamber 72. An adjustable needle valve 74 is threadably adjustably mounted in bearing member 36 and valve chamber 66 to regulate the rate of flow of inlet air through passage 68 and thus control the rate of movement of piston rod 40 as will be hereinafter described. A spring loaded ball type check valve 76 is mounted in valve chamber 72 to prevent passage of inlet air and permit passage of exhaust air. Air passage 60 is connected to the other side 80 of the power cylinder by air passage means comprising reduced diameter passage 82, a valve chamber 84, a transverse passage 86, an annular chamber 88, axially extending passage portions 90, 92 in the piston rod 40, and a transverse outlet passage 94. Passage 60 is also connected to the same side of the power cylinder through passage 82, valve chamber 96, annular chamber 88, and passages 90, 92, 94. An adjustable needle valve 97 is adjustably threadably mounted in bearing member 44 and valve chamber 84 to regulate the flow of high pressure air through inlet passage 86 and a spring loaded ball type check valve 98 is mounted in valve chamber 96 to prevent passage of inlet air while permitting passage of exhaust air.

The piston rod means 40 includes a tubular portion 100 slidably supported in suitably sealed bearing means 101 in end plate 32 and a reduced diameter member 102 having axially spaced abutment flanges 103, 104 providing piston connecting means located at opposite ends of a slide rod portion 106. A piston means 108, comprising a bearing sleeve 110, a disc 112, and sealing means 114, 116, is slidably mounted on the slide rod for movement between the abutment flanges 103, 104 to provide timing means to prevent movement of the piston rod 40 until after the jaw means have been properly positioned.

A spring loaded relief valve 118 is mounted in end plate 31 and extends into a chamber 122 which receives piston rod flange 103 in an uppermost position, FIG. 3, whereat valve 118 is positively opened to allow any air trapped in chamber portion 80 to escape through a port 126. A seal 128 engages the flange 103 in the fully extended position to prevent any leakage of high pressure inlet air.

In operation, with the apparatus in the position shown by the solid lines of FIGS. 1 and 2, at a predetermined time valve 49 is actuated to deliver high pressure air from source 48 to one side of power cylinders 16, 22 through air lines 50, 56 while exhausting air from the other side of the cylinders through air lines 54, 52. The high pressure air in line 56 is immediately effective to actuate power cylinder 22 to extend and then close the jaw means 20 on the part 24 over a predetermined time interval of, for example, one or two seconds. During the jaw extension and clamping time period, some of the high pressure air in line 50 also flows through passages 60, 82, past needle valve 97, through passages 86, 88, 90, 92, 94 into chamber 80 wherein it acts against the adjoining surfaces and gradually moves the piston 108 from the solid line fully retracted position to an intermediate dotted line position 108a whereat the piston engages the flange abutment 104 to begin to move the piston rod 40. The air in chamber 80 also acts against the abutment flange 103 to keep the piston rod in the retracted position until the piston engages the other abutment flange and acts against the seal 128 to prevent escape of high pressure air through valve 118. The rate of air flow is adjusted by needle valve 97 so as to move the piston 108 at a rate causing engagement of the piston with the piston rod abutment flange 104 after the jaw means has been extended and closed. Then when the piston moves the piston rod to the solid line fully extended position 108*b*, FIG. 3, the bearing housing 42, bearing shaft 44, support arms 46, 47, and the movable support frame 14 are moved downwardly about pivot means 136, FIG. 1, from the normal position parallel to the fixed plate 12 to an inclined position 14*b* whereat the jaw means and part 24 are lifted clear of the die cavity.

Then the high pressure air source 48 is connected by valve 49 to air hoses 52, 54 while hoses 50, 56 are connected to exhaust. Again the high pressure air is immediately effective to reversely actuate power cylinder 22 to retract and then open the jaw means at a predetermined point to release the part after a predetermined time interval. During the jaw retraction and opening time period, some of the high pressure air also flows through chamber 62, passage 64, valve chamber 66, and passage 68 to chamber 61 wherein it is effective to move the piston, without the piston rod, from the fully extended solid line position 108b of FIG. 3 to the dotted line position 108c whereat the piston engages the flange 103 and begins to move the piston rod 40. The high pressure air in chamber 61 also acts against flange 104, which is seated on end plate 32, to hold the piston rod in the fully extended position until the piston engages the other flange 103. The rate of air flow is adjusted by needle valve 74 so as to move the piston 108 at a rate causing engagement with the abutment flange 103 after the jaw means and the part gripped thereby have cleared the die cavity. The rate of travel of the piston may be varied to return the movable frame 14 to the parallel position at any desired time in relationship to the position of the jaw means being actuated to the fully retracted position by power cylinder 22. It will be understood that when the piston 108 moves in one direction by application by high pressure air to one side or the other, the air on the opposite side is exhausted through the ball valves 76, 98 which are opened during exhaust due to pressure differential while being maintained closed during application of the high pressure air due to the springs and a pressure balance in the system.

It is contemplated that the inventive concepts and principles herein disclosed may be variously otherwise embodied and it is intended that the appended claims cover alternative embodiments except insofar as limited by the prior art.

I claim:

1. Fluid operated power cylinder apparatus comprising a cylinder having a fluid chamber and an end wall defining one end of said chamber, a piston rod slidably mounted in and extending beyond said cylinder through said end wall for operative connection to an actuable device, a piston slidably mounted on said piston rod in said fluid chamber, high pressure fluid passage means connected to said fluid chamber on opposite sides of said piston to drive said piston between extended and retracted positions therein, said passage means including a passage extending through the rod and opening into said chamber out of opposite ends of the rod and a pair of separate fluid pressure inlet means located at said end wall and constructed to receive separate pressure fluid conduits separately and independently of each other conducting fluid from a pressure source, one of said fluid inlet means opening into the passage in said rod and including a housing mounted on and movable with the rod and an inlet passage in the housing opening into the passage in the rod, the other of said fluid inlet means being formed in said cylinder and opening into said one end of the chamber adjacent the end wall, connecting means between said piston and said piston rod effective during only a portion of the movement of the piston to provide a time delay operation of said piston rod between extended and retracted positions, said connecting means comprising axially spaced abutment means on said piston rod alternately engageable with opposite sides of said piston, said piston being slidably movable relative to said piston rod between said abutment means to effect the time delay.

2. The invention as set forth in claim 1 including a first of said abutments being located at an end of the rod and the other being located at a central point of the rod and being larger in area than the first abutment and engaging said end wall of the cylinder in said chamber to limit the movement of the rod.

* * * * *